United States Patent [19]
Naone et al.

[11] 3,905,148
[45] Sept. 16, 1975

[54] OUTRIGGER FISHING LINE SYSTEM WITH LINE RELEASE

[76] Inventors: Phillip L. Naone, 84-287 Holt St., Waianae, Oahu, Hawaii 96792; Raymond R. Turner, 9822 Cheshire Ave., Westminster, Calif. 92683

[22] Filed: June 17, 1974

[21] Appl. No.: 479,628

[52] U.S. Cl............................ 43/43.12; 24/201 TR
[51] Int. Cl............................................ A01k 91/00
[58] Field of Search................... 43/43.12, 27.4, 24; 24/115 F, 201 TR

[56] References Cited
UNITED STATES PATENTS

| | | | |
|---|---|---|---|
| 2,199,861 | 5/1940 | Sebrean et al............................ | 43/24 |
| 3,583,089 | 6/1971 | Scarbro.............................. | 43/42.04 |
| 3,659,370 | 5/1972 | Ritter............................... | 43/43.12 |
| 3,787,995 | 1/1974 | Watanabe........................... | 43/43.12 |
| 3,816,954 | 6/1974 | Bissonette.......................... | 43/43.12 |

*Primary Examiner*—Warner H. Camp
*Attorney, Agent, or Firm*—Forrest J. Lilly

[57] ABSTRACT

The device comprises a bifurcated body, with two legs bendable toward or from one another, a plastic sheave arranged for rotation on an axis in the slot between the two legs, and means for adjustably clamping the two legs together for adjustment of holding effort exerted on the sheave to stay in its normal place of rotation between the two legs. When a jerk of predetermined strength is exerted on the line by a striking fish, the guide pulley is jerked from between the holding legs, and drops in the water. The line is thus freed, and thereafter extends directly rearward from the tip of the fishing pole.

5 Claims, 6 Drawing Figures

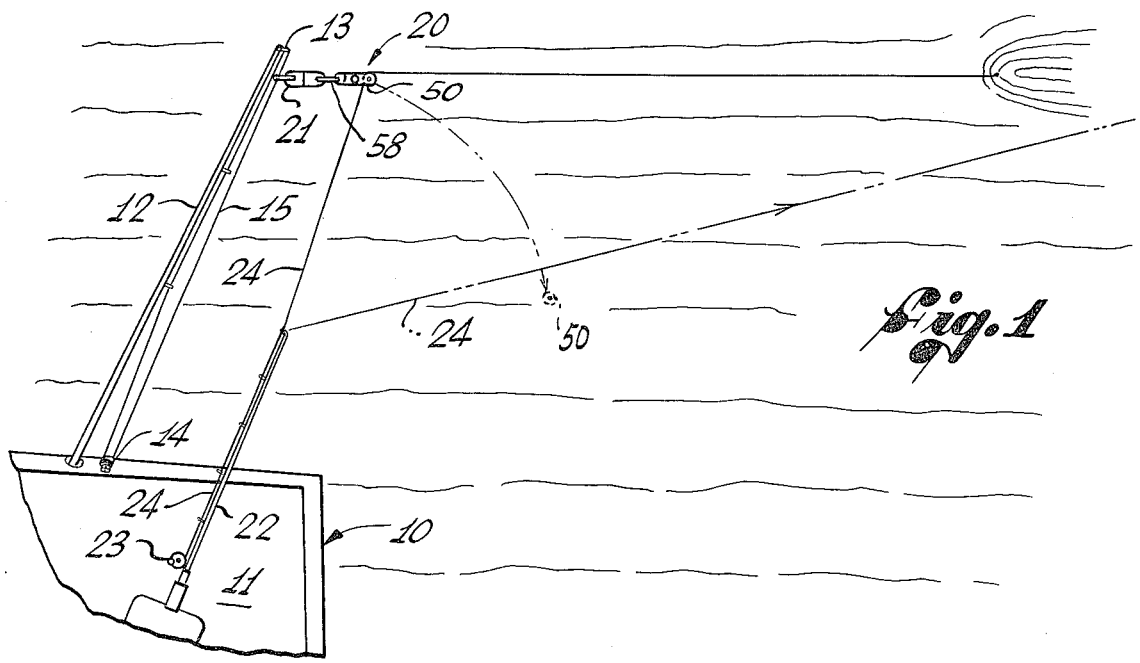
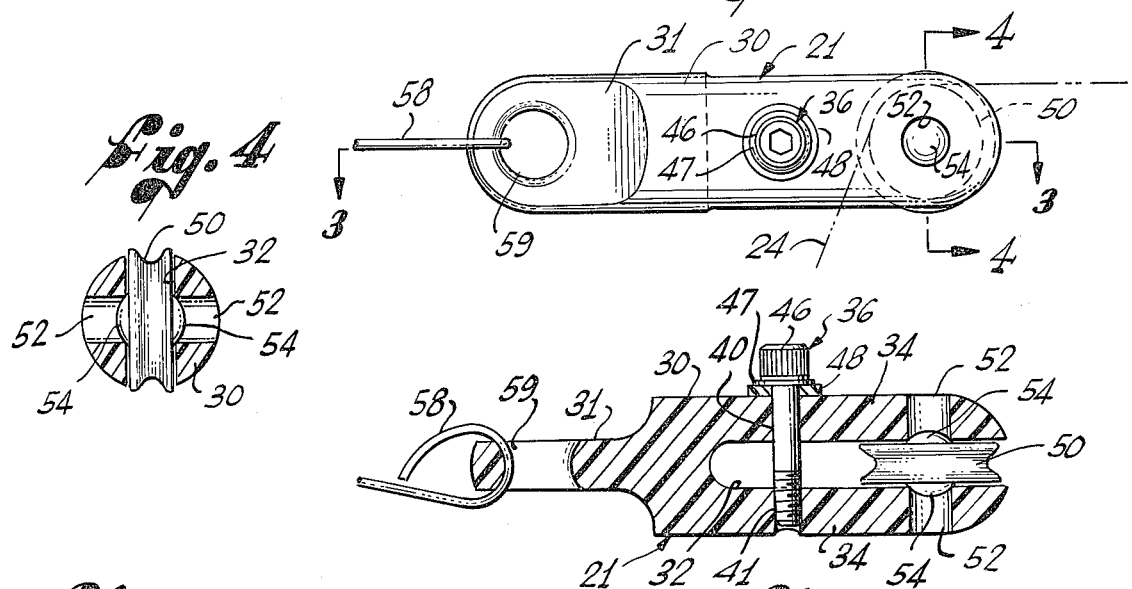
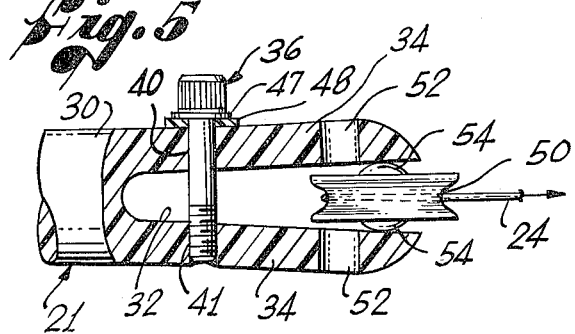

OUTRIGGER FISHING LINE SYSTEM WITH LINE RELEASE

BACKGROUND OF THE INVENTION

Field of the Invention

This invention pertains to outrigger fishing line systems now in use in trolling for certain classes of fish from fishing boats, and particularly to the line guide or clip located on the outrigger which normally guides the line from the end of the fishing pole and then allows it to travel from that point spaced well outwardly relative to the "wash" of the boat or to an adjacent "flat" line, for example.

It is common to construct such a clip or guide so that it will release the line owing to the jerk in the line when the bait is struck by a fish. Some of these have been adjustable. It is important that this release take place surely when a jerk of the right magnitude for the type of fish occurs. For some fish, or fishing conditions, the line is to be released when the jerk is relatively light; and in others, it may be necessary that the release operate only when a more powerful jerk is experienced at the guide. My guide accordingly has been contrived for adjustability, to release surely and positively upon a jerk of a magnitude desired or selected, and to positively prevent release until a jerk of at least the predetermined magnitude is exerted. A further purpose of the invention is to provide a guide that is improved as regards mechanical simplicity, is inexpensive, and is capable of adjustment easily and surely to release positively with the anticipated jerk.

BRIEF SUMMARY OF THE INVENTION

The present invention comprises a split or bifurcated body, characterized by two integral legs separated by a slot which receives a line sheave, for rotation therebetween, and provided with means for adjustably forcing the legs gradually toward one another to progressively pinch the sheave between the legs to exert a desired clamping force on the sheave. The fishing line passes from the tip of the pole over this sheave, and thence to a trailing, or "trolling," position. The body of this device is mounted on the outrigger in a common fashion. When a fish strikes the bait, and the line jerk is sufficient, the sheave yanks free of its supporting body, and is simply lost in the water, while the line is released, and its temporary slack is picked up by the pole. If the jerk is insufficient for the adjustment, the sheave will simply turn, but will not release the pulley.

BRIEF DESCRIPTION OF THE DRAWINGS

FIG. 1 is a diagrammatic plan view of a rearward portion of a fishing boat showing the outrigger fishing system and the release device of the present invention incorporated therein;

FIG. 2 is a side elevational view of the release device of the invention;

FIG. 3 is a section taken on line 3—3 of FIG. 2;

FIG. 4 is a transverse section taken on line 4—4 of FIG. 2;

FIG. 5 shows a portion of the device with its bifurcations spread to enable introduction of the sheave therebetween; and FIG. 6 is a perspective view of the sheave of the invention.

DESCRIPTION OF A PREFERRED EMBODIMENT

In FIG. 1, numeral 10 designates, more or less diagrammatically, a fragmentary plan view of the right hand rearward portion of a fishing boat, the cockpit being indicated at 11.

At 12 is the usual outrigger, furnished at its outer end with a sheave 13. A second sheave 14 can be mounted on the side of the cockpit, as here shown, or the base of the pole. An endless halyard 15 passes over these sheaves, and through grommets on the outrigger, as shown.

The release device of the invention is designated at 20, and is connected by a conventional swivel snap at 21 to a point on the halyard.

The fishing pole 22 is conventionally mounted on the side of, or within, the cockpit 11, and has a reel 23, and fishing line 24, which is outreached by the outrigger, in the usual way.

The release device may be composed of a suitable plastics material, such as an acrylic, sold under the trademark PLEXIGLAS. It is in the form of a cylinder 30, flattened into an apertured flat tang 31 at one end and bifurcated or split by a flat and normally parallel sided longitudinal slot 32 extending into it from the other. The two legs 34 so formed are capable of resilient or elastic flexure to spread them slightly apart, or draw them together from strict parallelism. For the latter purpose an adjustment screw 36 extends through a smooth bore 40 in one leg at about the center of the body, and into an aligned threaded bore 41 in the other leg. As here shown, the screw has an Allen head 46 on one end, with a steel washer 47 beneath it, bearing on a soft rubber (neoprene, for example) washer 48 placed between the Allen screw head and the corresponding leg 34. The other end of the screw threads into the threaded bore in the other leg, and it will be seen that as the screw is turned right-handedly, said other leg is drawn to the first, and the slot between the two legs is reduced in width by the resulting elastic bending of the two legs toward one another.

A grooved sheave 50 for the fishing line is mounted between the extremities of the legs 34, in the position shown. The axis of rotation of the sheave is determined by two aligned bores 52 in the legs. The sides of the sheave have convex axial protuberances 54, preferably in the form of spherical, ball segments. Preferably, and in my preferred embodiment, the ball has a radius a trifle greater than that of the bore, and thus seats near its periphery on the adjacent edge of the bore. Thus, for a bore diameter 0.272 inch, the ball segment may have a diameter of 0.312 inch. The sheave may have a thickness of 0.250 inch, and the slot between the legs may be substantially the same.

To install the sheave, the clamp screw is loosened, and the sheave then inserted into the slot, and pressed toward the bores 52. The ball segments cam the legs apart, the legs flexing as seen in FIG. 5. The ball segments snap into the bores when sufficiently aligned therewith, and then occupy the position of FIG. 3.

The mounting of the sheave on the bore edges, with at least a light pressural engagement, results in a sheave which turns easily, but with sufficient friction that it is not free running. The friction can then be progressively increased by tightening the adjustment screw. With no added tightening, the ball segments on the sheave, engaged in the ends of the mounting bores, furnish a substantial degree of restraint against being jerked out of the device by the striking of a fish. This restraint can be progressively increased to any degree desired by tightening the clamping screw.

When the sheave is yanked free, the line is released from the outrigger guide, and the slack is shortly taken up by the motion of the boat, so the line will then move to trail from the end of the pole, as indicated by the dash line in FIG. 1.

The line guide and release device of the invention is connected to the aforementioned swivel by a wire 58 passing through the aperture 59 in its tang 31. With the line guide and release device hauled in, the fishing line is strung from the end of the fishing pole over its sheave, the leader and bait attached, and the device then hauled back out.

Those skilled in the art will understand the use of the device fully from their own experience and foregoing description. The device is simple, approaching the problem in a novel and improved fashion. The sheave operates smoothly and predictably, being released in accurate response to the setting of the clamp screw. The plastic sheave is very inexpensive, and the cost of using a new sheave after each is lost in use is negligible.

I claim:

1. A fishing line guide releasable by a jerk on the line of predetermined magnitude, comprising:
    a body having a slot therein,
    a fishing line sheave rotatable on said body in said slot,
    means mounting the sheave for rotation in the slot for release of the sheave from the slot in response to a jerk in a fishing line looped about said sheave.

2. The subject matter of claim 1, wherein said body is made of a resilient material and said body comprises two legs on opposite sides of said slot which are elastically bendable apart or together under separating or closing stress, respectively,
    the means mounting the sheave in the slot comprising on each side of the sheave, and at the adjacent side of said leg, and centered on the axis of rotation, a protuberance and a socket paired therewith.

3. The subject matter of claim 2 including also a clamp screw adjustably connecting said legs and adapted to draw said legs toward one another and against the sides of the sheave to apply a predetermined clamping force on said sheave.

4. The subject matter of claim 1, wherein said body is made of a resilient material and said body comprises two legs on opposite sides of said slot which are elastically bendable apart or together under separating or closing stress, respectively,
    the means mounting the sheave in the slot comprising transverse sockets in said legs on the axis of the sheave, and axial protuberances on said sheave receivable in said sockets, and
    an adjustable clamp screw passing freely through one of said legs and screw-threaded into a screwthread bore in the other of said legs.

5. The subject matter of claim 4, wherein said sockets in said legs comprise aligned bores therethrough, and said protuberances comprise convex heads engageable in the inner ends of said bores.

* * * * *